(12) United States Patent
Burbaum et al.

(10) Patent No.: US 12,103,108 B2
(45) Date of Patent: Oct. 1, 2024

(54) LASER METAL DEPOSITION OF HIGH GAMMA PRIME SUPERALLOYS WITH COOLING EFFECT

(71) Applicant: Siemens Energy, Inc., Orlando, FL (US)

(72) Inventors: Bernd Burbaum, Falkensee (DE); Ahmed Kamel, Orlando, FL (US); Dhafer Jouini, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 325 days.

(21) Appl. No.: 16/639,286

(22) PCT Filed: Aug. 15, 2017

(86) PCT No.: PCT/US2017/046901
§ 371 (c)(1),
(2) Date: Feb. 14, 2020

(87) PCT Pub. No.: WO2019/035810
PCT Pub. Date: Feb. 21, 2019

(65) Prior Publication Data
US 2021/0370441 A1    Dec. 2, 2021

(51) Int. Cl.
*B23K 26/00* (2014.01)
*B23K 26/144* (2014.01)
(Continued)

(52) U.S. Cl.
CPC ........ *B23K 26/342* (2015.10); *B23K 26/0006* (2013.01); *B23K 26/144* (2015.10);
(Continued)

(58) Field of Classification Search
CPC .......... B23K 2101/001; B23K 2103/26; B23K 26/0006; B23K 26/144; B23K 26/342;
(Continued)

(56) References Cited

U.S. PATENT DOCUMENTS 9,168,328 B2 * 10/2015 Sun ................. A61L 27/56
9,694,423 B2 *  7/2017 Bruck .............. B22F 10/28
(Continued)

FOREIGN PATENT DOCUMENTS

CN    105263667 A    1/2016
CN    105414746 A    3/2016
(Continued)

OTHER PUBLICATIONS

PCT International Search Report and Written Opinion mailed Jun. 28, 2018 corresponding to PCT Application No. PCT/US2017/046901 filed Aug. 15, 2017.

*Primary Examiner* — Janie M Loeppke
*Assistant Examiner* — Abigail H Rhue

(57) ABSTRACT

Systems (100) and methods (1000) for additively manufacturing or repairing a component from a base material (10). The system may include a laser metal deposition (LMD) system (200) operably connected to a means for cooling (300) the base material during laser processing of additive materials deposited in a melt pool on the base material. The LMD system includes a laser energy source (202) configured to direct laser energy towards the base material to form the melt pool thereon and to processes the deposited additive materials to form layers on the base material upon solidification. The means for cooling may be configured to cool the base material to within a cooling temperature range during the LMD process, which results in, e.g., a cooling/freezing effect. This cooling effect shortens the solidification period during laser processing and allows for weld heat to be released from the base material.

17 Claims, 2 Drawing Sheets

(51) Int. Cl.
*B23K 26/342* (2014.01)
*B23K 26/70* (2014.01)
*B33Y 10/00* (2015.01)
*B33Y 30/00* (2015.01)
*B33Y 40/00* (2020.01)
*B33Y 40/10* (2020.01)
*B33Y 70/00* (2020.01)
*B33Y 80/00* (2015.01)
*B23K 101/00* (2006.01)
*B23K 103/18* (2006.01)

(52) U.S. Cl.
CPC ............ *B23K 26/703* (2015.10); *B33Y 10/00* (2014.12); *B33Y 30/00* (2014.12); *B33Y 40/00* (2014.12); *B33Y 40/10* (2020.01); *B33Y 70/00* (2014.12); *B33Y 80/00* (2014.12); *B23K 2101/001* (2018.08); *B23K 2103/26* (2018.08)

(58) Field of Classification Search
CPC ....... B23K 26/703; B23P 6/007; B33Y 10/00; B33Y 30/00; B33Y 40/00; B33Y 40/10; B33Y 70/00; B33Y 80/00; F01D 5/005
See application file for complete search history.

(56) References Cited

U.S. PATENT DOCUMENTS

| | | | |
|---|---|---|---|
| 9,770,781 | B2 | 9/2017 | Bruck et al. |
| 10,443,115 | B2 * | 10/2019 | Carter .................. B23K 26/144 |
| 10,527,362 | B2 * | 1/2020 | Vos ........................... F28F 7/02 |
| 11,130,277 | B2 * | 9/2021 | Rubinsky .............. B29C 64/118 |
| 11,235,409 | B2 * | 2/2022 | Kruer ..................... B23K 9/044 |
| 2005/0173380 | A1 * | 8/2005 | Carbone ............... B23K 15/002 |
| | | | 219/121.31 |
| 2016/0326880 | A1 | 11/2016 | Slavens et al. |
| 2017/0051386 | A1 | 2/2017 | Carter et al. |

FOREIGN PATENT DOCUMENTS

| | | |
|---|---|---|
| CN | 106077647 A | 11/2016 |
| EP | 1637274 A1 | 3/2006 |
| EP | 3132885 A1 | 2/2017 |
| EP | 3187286 A1 | 7/2017 |
| JP | 2010153278 A | 7/2010 |
| JP | 2017066023 A | 4/2017 |
| RU | 2105084 C1 | 2/1998 |
| RU | 2533572 C2 | 11/2014 |
| RU | 2015131829 A | 3/2017 |
| WO | 2014120991 A1 | 8/2014 |
| WO | 2015109102 A1 | 7/2015 |
| WO | WO-2018089080 A1 * | 5/2018 ......... B23K 26/0604 |

* cited by examiner

1010 — providing a base material and placing the base material or other component into a vessel for laser metal deposition (LMD);

1020 — cooling the base material or at least portions thereof, via a cooling means, to a cooling temperature range and maintaining a desired cooling temperature with the range resulting in a deep cooling effect of the base material;

1030 — while cooling the base material, commencing the LMD process by melting at least portions of the base material and depositing a base alloy material and/or a braze alloy material onto the base material, e.g., the melted portions, to form layers of a desired part, e.g., industrial machine part upon solidification, which is more rapid resulting from the cooling effect; and 1040 — brazing the desired part.

Fig. 2

LASER METAL DEPOSITION OF HIGH GAMMA PRIME SUPERALLOYS WITH COOLING EFFECT

TECHNICAL FIELD

The present disclosure relates generally to the field of materials technology, and more particularly to additive manufacturing and repair methods using laser metal deposition of high gamma prime superalloys with a cooling effect.

BACKGROUND

Welding of superalloys presents a variety of technical challenges because of the high strength (and corresponding low ductility) that these alloys are optimized to achieve. Heat sources such as lasers and arcs are being applied to build additively manufactured (AM) parts or repair damaged superalloy components. Unfortunately, these alloys are very prone to hot cracking during, e.g., laser metal deposition (LMD) processes and subsequent heat treatment. The hot cracking during welding at room temperature normally occurs at the solid-liquid interface in the melt pool, which structurally compromises the integrity of the AM or repaired component. Therefore, a need remains for an LMD system or process that suppresses hot cracking occurring during welding.

SUMMARY

It should be appreciated that the present inventor has recognized the above limitations, and now discloses a new laser metal deposition process, e.g., of high gamma prime superalloys, by utilizing a cooling effect, e.g., a deep cooling effect, and subsequent brazing.

In one exemplary embodiment, a system for additively manufacturing (AMR) or repairing a superalloy component from a base material is provided. The AMR system may include at least a laser metal deposition (LMD) system operably connected to a means for cooling the base material during laser processing build-up of additive materials on the base material. The LMD system may include a laser energy source operably configured to direct laser energy towards the base material to form a melt pool thereon. The laser energy processes the additive materials deposited into the melt pool (e.g., on the base material) for forming layers of the additive materials upon solidification.

The means for cooling the base material may be configured to cool the base material, e.g., via a cooling medium, to a desired temperature with a cooling temperature range resulting in, e.g., a cooling/freezing effect of the base material during laser processing, which may result in shorter solidification periods during laser processing. It should be appreciated that the desired temperature range may be specific to the type of cooling medium used, e.g., liquid nitrogen, liquid argon, etc., and should be a temperature within a temperature range that allows for weld heat to be released from the base material during laser processing due at least in part to the cooling/freezing effect of the base material. Examples of the cooling range may be −100° C. to −150° C. for liquid nitrogen, −100° C. to −150° C. for liquid argon. Additionally or alternatively, it should be appreciated that in addition to or in lieu of the range being varied based on the type of cooling medium utilized, the range may depend upon the heat (e.g., high temperature) being applied to the base material and/or the composition of the base material. For example, a base material having higher melt temperature may require more heat during laser processing, which may require deeper cooling ranges, i.e., lower ranges, in order to release any weld heat from the base material during laser processing. Said another way, the desired cooling range may be based, in part, on any one or more of the cooling medium type, heat temperature from the laser energy source and the base material type.

In another exemplary embodiment, an additive manufacturing or repair method is provided. The method may include providing a base material substrate (BMS), e.g., in a vessel, and preparing the BMS for laser metal deposition (LMD) processing. The method may also include cooling the BMS, e.g., via a cooling means, to a temperature within a cooling temperature range that results in the BMS undergoing a cooling or freezing effect to release weld heat from the BMS. It should be appreciated that the cooling temperature may be maintained throughout the LMD process, and adjusted, if necessary, based in part on the temperature of one or more of the BMS or a cooling medium of the cooling means. While cooling the BMS, the BMS, or at least portions of the BMS, may undergo laser processing to form layers of additive materials onto the BMS to accomplish a desired component.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 2 illustrates a block diagram of an additive manufacturing or repair process in accordance with the disclosure provided herein.

DETAILED DESCRIPTION

Figure 1:
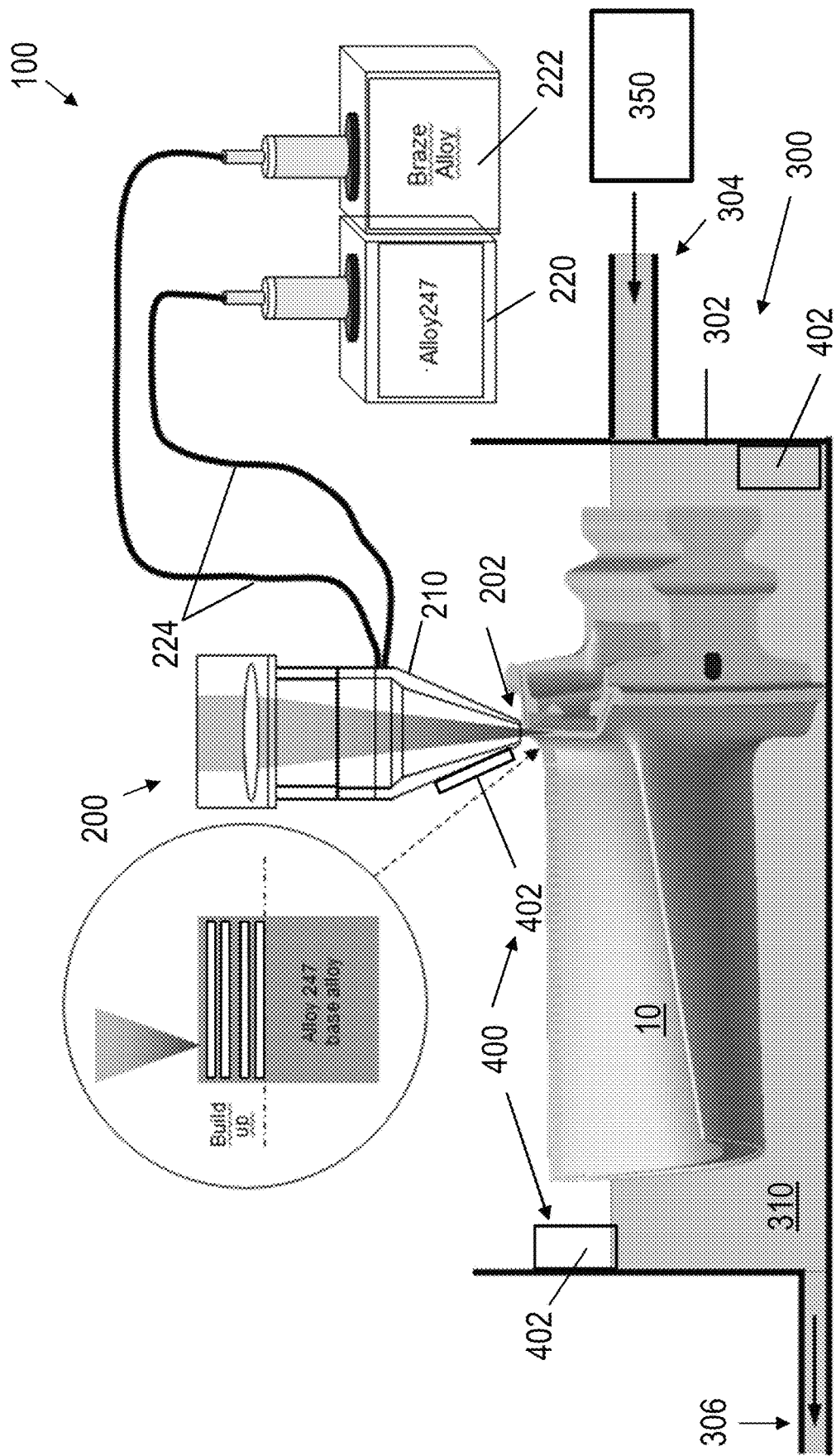
FIG. 1 schematically illustrates a system for additively manufacturing and/or repairing superalloy components via laser metal deposition (LMD), in accordance with the disclosure provided herein.

The components and materials described hereinafter as making up the various embodiments are intended to be illustrative and not restrictive. Many suitable components and materials that would perform the same or a similar function as the materials described herein are intended to be embraced within the scope of embodiments of the present invention.

The present inventors have developed a novel additive manufacturing (AM) and/or repair method that involves a variation of a laser metal deposition (LMD) process where a cooling system, e.g., a deep cooling system is combined with the LMD system to cool down a superalloy base material/substrate/component, e.g., a gas turbine blade, vane, blade surface, etc., and to reduce or eliminate entirely hot cracking that occurs during the welding process or subsequent heat treatment.

Referring now to the drawings wherein the showings are for purposes of illustrating embodiments of the subject matter herein only and not for limiting the same, FIG. 1 illustrates a system 100 for additively manufacturing a component from a base material/substrate and/or repairing a superalloy component 10 via laser metal deposition (LMD).

The system 100 may include an LMD system 200 for applying a laser energy, via a laser energy source 202, to the underlying substrate, and for depositing additive/build-up materials into a melt pool of the underlying/base substrate 10 (or onto a solidified layer of the build-up material) resulting from the laser energy to form layers of the build-up materials for manufacturing or repairing a desired superalloy component, e.g., a blade, blade platform side face (shown in FIG. 1), blade tips, vanes or other components. The laser energy source 202 may be operably configured to direct or emit laser energy therefrom and towards the base material 10 for melting portions of the base material 10 (or a previously solidified build-up layer) to form the melt pool.

Additionally or alternatively, the LMD system 200 may also include a laser deposition tool 210 operatively connected to the laser energy source 202 and in the proximity of or operably coupled to the laser energy source 202 for depositing the build-up (additive) materials into a melt pool formed from the laser energy and on the base material 10.

Additionally or alternatively, the laser energy source 202 may be operatively configured to function as the laser deposition tool for depositing the build-up materials into the melt pool. That is, the additive materials may be deposited via the laser energy source 202, or more particularly, via feed lines 224 connected to a housing shared with the laser energy source 202, in addition to or in lieu of being deposited via the deposition tool 210. The LMD system may further include or be operably connected to one or more powder feed systems (220, 222). The powder feed systems 220, 222 may be configured to feed (deliver) the build-up materials to one or more of the laser energy source 202 or laser deposition tool 210 for depositing the build-up materials into the melt pool and/or onto the base material 10 for forming layers of the additive material to form a desired component.

The build-up (additive) materials may include, e.g., a base alloy powder material, which may include the same or similar materials forming the base material 10. The base metal powder may be fed through the LMD system 200 via the power feed system (220) and deposited into the melt pool or onto the base substrate 10 during the LMD process. The build-up materials may also include a braze alloy powder material or the like, which may be fed through the laser energy source 202 via the same feed system as the base metal powder, or its own powder feed system (222), and deposited into the melt pool or onto the underlying substrate 10 for laser processing with, e.g., the laser energy during the LMD process. The powder feed system 220 may be operably connected to the LMD system 200, or more particularly, a laser deposition tool 210 via one or more feed lines 224 for feeding the build-up materials from, e.g., a container of the materials, to the underlying substrate 10. Additionally or alternatively, a controller (not shown) may be operably connected to one or both the LMD system 200 or powder feed system 220 and may be configured to control the feed rate of the build-up materials through, e.g., the laser tool 210 during the LMD process.

Each of the build-up materials deposited during the LMD process, e.g., the base alloy material and the braze alloy material, may be fed/provided by its own powder feed system 220, i.e., a single system for each material, or in a further embodiment, a single powder feed system 220 may be used for feeding both types of build-up materials. It should be appreciated that if more than two types of materials are utilized during the LMD process, additional powder feed systems 220 may be use for feed the additional materials, or a single powder feed system may be configured to feed each of the materials as needed.

With continue reference to the figures, the system 100 may also include a cooling means for cooling the base substrate 10, e.g., during the LMD process to reduce or eliminate any hot cracking associated with the LMD process, the brazing process, or any subsequent heat treat process. In one exemplary embodiment, the cooling means 300 may be a cooling system, e.g., a deep cooling system, which may include a vessel, chamber, or similar container 302, which may be sized and adapted for at least partially receiving the base substrate 10 or other superalloy component to be repaired therein, and which may define a volume for containing a cooling medium 310 therein and/or flowing therethrough for cooling the base substrate 10 in the vessel 302. The vessel 302 may include an inlet 304 adapted for receiving the cooling medium 310 and an outlet 306 for discarding, e.g., the cooling medium from the vessel. Additionally or alternatively, the base substrate 10 may be placed in a path of the flowing cooling medium 310, e.g., for a deep cooling effect while undergoing the additive manufacturing or repair process.

The cooling system 300 may further include one or more pumps (not shown) or similar pump/feed systems 350 for providing the cooling medium 310 to the vessel 302 for cooling the substrate 10 therein. It should be appreciated that the pump may be controlled by any of the system 100 or LMD system 200 controllers, or additionally or alternatively, the pump system may include its own controller operably configured for controlling the flow-rate and content of the cooling medium 310 filling or flowing through the vessel 302 for maintaining a desired cool temperature range of the cooling medium within or through the vessel 302 and during the LMD process.

The cooling medium 310 may be, e.g., a liquid nitrogen, argon, helium, etc., or any other liquid medium capable of being fed into the vessel 302 for achieving the desired cooling temperature range to remove any weld heat from the base substrate 10 or component being worked upon. In one embodiment, the cooling range may be between With continued reference to the figures, the system 100 may further include a sensor system 400 operatively connected to one or more of the LMD system 200 and cooling means 300 for sensing temperatures during the cooling and LMD process and for transmitting or communicating the sensed temperatures to any of the system controllers for determining whether the desired cooling range has been achieved, and/or for adjusting the heating and/or cooling parameters.

In one embodiment, the sensor system 400 may include one or more sensors 402 operatively configured to sense temperatures and communicate the sensed temperatures, e.g., via one or more transmitters, to a sensor controller or any of the system controllers for using the sensed temperatures during the LMD and/or cooling process. The sensors 402 may be uniformly arranged or arranged in any configuration within the vessel or proximate thereto for sensing temperatures of one or more of the cooling medium 310, the substrate 10, and/or the surrounding areas. As illustrated in FIG. 1, sensors 402 may be position within the vessel 302, e.g., attached to a wall of the vessel, immersed (partially or fully) in the cooling medium 310, and/or removably secured to the laser source 202, a housing of the laser source or proximately thereto.

During the LMD process, e.g., and to determine whether the desired temperature range for cooling or deep cooling the substrate 10 during the LMD process has been achieved and/or is maintained, the sensors may transmit or otherwise communicate the sensed temperatures to the controllers, wherein any of the heating and/or cooling parameters may be adjusted based, at least in part, on the sensed temperatures. For example, in the cooling system 300, flow and/or content of the cooling medium may be adjusted as needed, and based on the sensed temperature, to achieve the desired cooling temperature range, e.g., −100° C. to −150° C. for at least nickel based superalloy.

It should be appreciated that the desired temperature range may vary, e.g., ±20 to 40° C., depending on the type of superalloy base material 10 being worked upon. Additionally or alternatively, the heat emitted by the laser energy source 202 may be adjusted, i.e., increased or decreased, based on the sensed temperatures.

With continue reference to the figures, and now FIG. 2, an embodiment of an LMD process (method) 1000 is provided. It should be appreciated that any steps disclosed herein are not required to be performed in any particular order, and are hereby provided for exemplary purposes. For example, steps for filling the vessel 302 with the cooling medium 310 may occur prior to or subsequent to steps for placing or securing the base material 10 in the vessel for LMD processing.

The method 1000 may include the step of placing a base material 10 or other component to be repaired into the vessel 302 (1010). In this step, the base material/substrate 10 or damaged component may be removably secured in the vessel 302 and to, e.g., a platform (not shown) for build-up and/or repair. It should be appreciated that in embodiment where the a component is being repaired, the method 1000 may include steps for removing the component from an industrial machine, and preparing the component for LMD, e.g., by excavating any damaged portions of the component, and pre-heat or solution treatment of the component prior to placing the component in the vessel for the LMD process.

Upon preparing the component and/or placing the component or base substrate 10 in the vessel 302, the method 1000 may include cooling the base substrate 10 or at least portions thereof via a cooling means (1020). In this step, the substrate 10, or portions thereof, may be immersed in a cooling medium 310 at least partially filling the vessel 302. In one exemplary embodiment, the vessel 302 may be filled with the cooling medium 310 such that at least part of the substrate 10 may be immersed in the cooling medium for deep cooling the substrate during the LMD process. The cooling medium 310 may be liquid nitrogen or any other liquid medium capable of cooling the substrate 10 to a desired temperature range so that any welding heat may be released or removed from the substrate 10. It should be appreciated that by using liquid nitrogen, the base material 10 (e.g., turbine blade or vane) may be cooled down inside the vessel to a temperature in the rage of −100° C. to −150° C.

While the substrate is cooled, i.e., being maintained at the desired temperature range, the method 1000 may include the step of depositing the build-up (additive) powdered materials (e.g., the underlying base metal alloy powder and braze alloy material) onto the substrate and laser processing the build-up materials on the substrate 10 (1030). To maintain the cooling temperature and deep cooling effect, the temperature gradient/cooling rate maybe be increased to achieve minimum cracking during, e.g., the welding process. In this step, it should be appreciated that the powder build-up (additive) materials, e.g., the base alloy material and braze alloy material, may be fed through, e.g., the laser source tool via the powder feed system, and deposited onto the substrate 10 or into a melt pool of the substrate. It should be appreciated that the melt pool may be protected by a shielding gas, e.g., argon, helium or mixtures thereof. It should be further appreciated, additionally or alternatively, that the additive materials may be transported, e.g., carried, to the melt pool using the shielding gas.

Upon being deposited, the laser energy processes/melts the build-up materials, which subsequently solidifies to form a layer(s) of superalloy material for forming the desired part or component. It should be appreciated that the mixture of the base alloy and the braze alloy powder can be verified layer-wise, and the depositing and laser processing step may be repeated until the shape and/or geometry of the desired component is achieved. Repair of the component via the inventors' novel LMD process allows for structural repair of components by using the same base alloy materials that are the same material as the base material. That is, the LMD process allows for repair of the component with materials (additive materials) having, e.g., an identical or near identical composition as the underlying (base) substrate 10.

The deep freezing effect resulting from the cooling system 300 allows the substrate 10 to remain cool during the LMD process, which results in the suppression of any hot cracking at, e.g., the solid-liquid interface in the melt pool to be suppressed. This suppression results from a very short solidification process resulting directly from the substrate being cooled to a desired temperature and/or within a cooling temperature range for the substrate 10 to achieve a deep cooling and/or freezing effect of the substrate 10 such that any weld heat may be released from the substrate 10.

Additionally or alternatively, the method 1000 may include a high temperature brazing of the substrate 10, e.g., torch brazing, furnace brazing, etc. (1040). It should be appreciated that during the subsequent high temperature brazing process 1040, a self-healing of the substrate 10 or desired component may be achieved at least in part due to the braze alloy material deposition during the LMD process. This may result in any minimal cracking that may have occurred during the welding process to be removed by, e.g., a final high temperature braze process. Additionally or alternatively, the method 1000 may include steps for finishing the desired component. It should be appreciated that processes for repairing damaged components may be require steps for removing the damaged component from, e.g., a turbomachine engine, and therefore, the repairing method 1000 may also include steps for removing the component, in addition to preheat treating or solution treating the component prior to the component undergoing the LMD process or subsequent braze process.

It should be appreciated that aspects of the exemplary systems disclose herein, e.g., the LMD system, powder feed and/or pump systems, sensor system, etc., may be implemented by any appropriate processor system using any appropriate programming language or programming technique. The system can take the form of any appropriate circuitry, such as may involve a hardware embodiment, a software embodiment or an embodiment comprising both hardware and software elements. In one embodiment, the system may be implemented by way of software and hardware (e.g., processor, sensors, etc), which may include but is not limited to firmware, resident software, microcode, etc.

Furthermore, parts of the processor system can take the form of a computer program product accessible from a processor-usable or processor-readable medium providing program code for use by or in connection with a processor or any instruction execution system. Examples of processor-readable media may include non-transitory tangible processor-readable media, such as a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

We claim:

1. A system (100) for additively manufacturing or repairing a superalloy component from a base material (10) comprising:
   a laser metal deposition (LMD) system (200) comprising:
      a laser energy source (202) operably configured to direct a laser energy towards the base material for forming a melt pool thereon and for laser processing additive materials deposited into the melt pool for forming a layer of the additive materials on the base material; and
      a means for cooling (300) the base material during laser processing to a desired cooling temperature within a range of −100° C. to −150° C., the means for cooling including a vessel (302) containing a liquid medium (310) in which a portion of the base material is submerged, the liquid medium including one of liquid nitrogen, liquid argon and liquid helium, flowing the liquid medium through the vessel and placing the base material in a flow of the liquid medium,
   wherein the melt pool or the layer of the additive materials are not in contact with the liquid medium (310) and is supported by the base material.

2. The system of claim 1, wherein the additive material comprises at least one of a base metal powder and a braze metal powder.

3. The system of claim 1, wherein the vessel (302) supports the base material during laser processing and is operably connected to a means for dispensing a cooling medium into the vessel for cooling the base material to a desired cooling temperature.

4. The system of claim 3, wherein the vessel comprises an inlet (304) and outlet (306) for controlling the flow of the cooling medium therein.

5. The system of claim 4, wherein the means for dispensing the cooling medium is a pump system (350) operably connected to at least the inlet of the vessel for dispensing the cooling medium therein.

6. The system of claim 5, wherein the pump system comprises a pump connected to the inlet for dispensing the cooling medium and a controller for controlling the flow and content of the cooling medium to achieve a desired cooling temperature.

7. The system of claim 6 further comprising a sensor system (400) operably connected to the pump system for sensing a temperature of at least one of the base material and cooling medium within the vessel, and for providing the sensed temperature to the controller for controlling the flow and content to achieve the desired cooling temperature and for maintaining the desired cooling temperature to release welding heat from the base material.

8. The system of claim 1, wherein the LMD system further comprises:
   a deposition tool (210) operably connected to a powder feed system and configured to deliver the additive materials for laser processing once deposited.

9. The system of claim 8, wherein the deposition tool is operably connected to the laser energy source for laser processing of the delivered additive materials.

10. An additive manufacturing or repair method comprising:
    preparing a base material substrate (BMS) for laser metal deposition (LMD) processing;
    submerging a portion of the base material substrate (BMS) in a liquid medium contained within a vessel, the liquid medium including one of liquid nitrogen, liquid argon and liquid helium, flowing the liquid medium through the vessel and placing the base material substrate (BMS) in a flow of the liquid medium;
    cooling the BMS with the liquid medium during laser processing to a desired cooling temperature within a range of −100° C. to −150° C., and maintaining the temperature within the cooling temperature range;
    while maintaining the temperature of the BMS or upon achieving the cooling temperature range, commencing LMD processing of the BMS by melting at least portions of the BMS and depositing additive materials into the melted portions to form a build-up layer of the additive materials on the BMS,
    wherein the melted portions and the build-up layer of the additive materials are not in contact with the liquid medium and are supported by the base material.

11. The method of claim 10, further comprising a cooling medium distribution system operably connected to the vessel and configured to dispense the cooling medium into the vessel for cooling the BMS and to control flow and content of the cooling medium to achieve a desired temperature within the cooling temperature range.

12. The method of claim 11, wherein the cooling medium distribution system comprises a pump system operably configured to dispense the cooling medium and control the flow and content of the cooling medium in the vessel.

13. The method of claim 12, wherein the cooling medium distribution system is operably connected to a sensor system configured for sensing one or more of a cooling medium temperature or a BMS temperature, and wherein the pump system adjusts the flow and content of the cooling medium based in part on temperatures sensed by the sensor system.

14. The method of claim 10, wherein the additive materials comprise at least one of a base metal powder and a braze metal powder.

15. The method of claim 14, wherein the additive materials comprise a similar or a same chemical composition as the BMS.

16. The method of claim 10 further comprising:
    brazing the BMS or at least portions thereof to achieve a desired component.

17. The method of claim 10 wherein the base material is a superalloy base material.

* * * * *